3,222,625
RESINOUS-TYPE TERMINAL-BUSHING CONSTRUCTION WITH ENCAPSULATED CURRENT TRANSFORMER
Marcel Ledocq, Marcinelle, Belgium, assignor to Ateliers de Constructions Electriques de Charleroi, Charleroi, Belgium, a corporation of Belgium
Filed Dec. 20, 1961, Ser. No. 160,870
1 Claim. (Cl. 336—174)

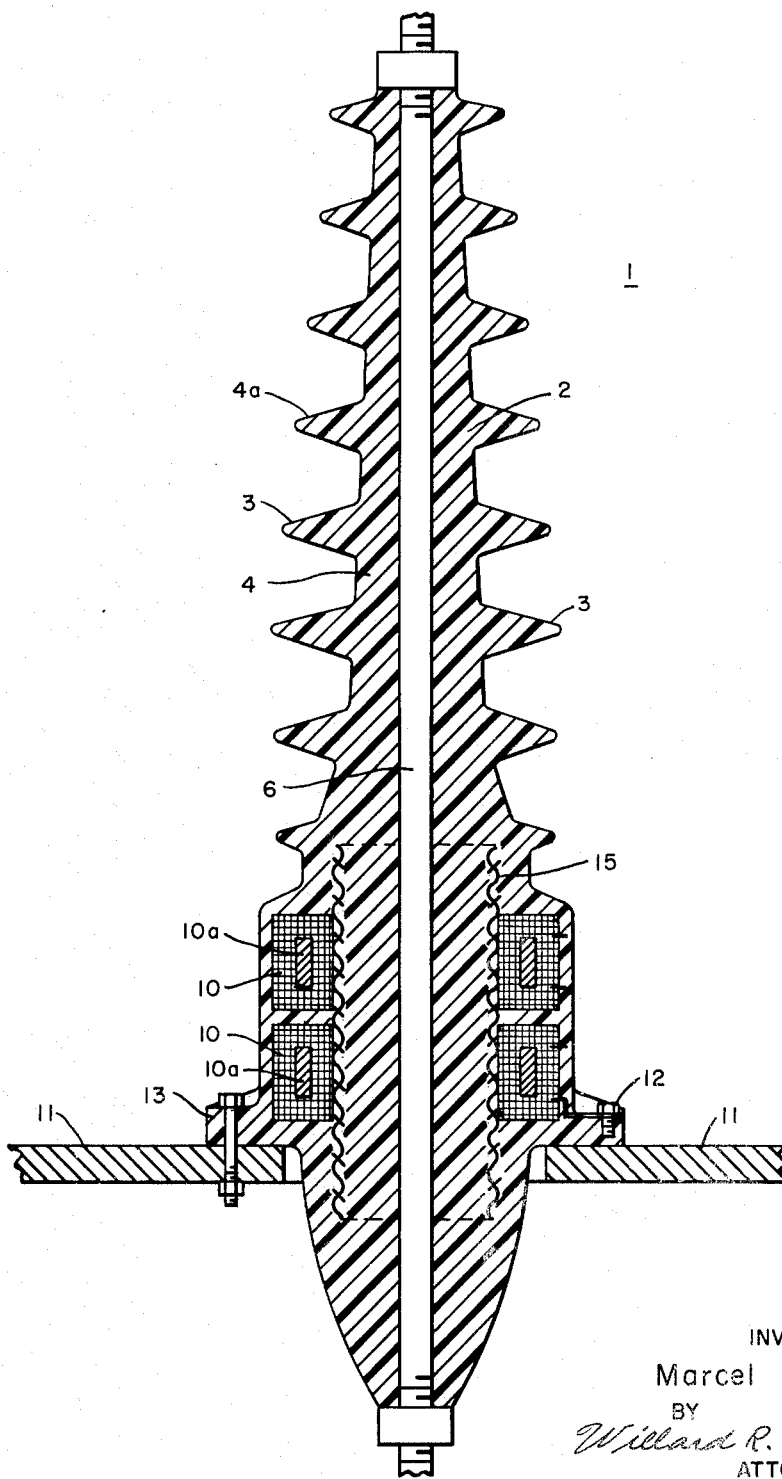

This invention relates to terminal-bushing constructions in general, and, more particularly, to terminal-bushing constructions utilizing a synthetic resin for the insulating body of the bushing.

A general object of the present invention is to provide an improved compact highly-efficient and accurately-fabricated terminal bushing.

A more specific object of the present invention is to provide an improved terminal bushing in which the current transformers may be embedded, or encapsulated, within the synthetic resinous material constituting the body of the terminal bushing.

Generally, the present invention concerns a cast synthetic resin terminal bushing in which the current transformers, associated with the terminal bushing, are embedded relatively closely to the axial terminal stud and are preferably completely covered by the synthetic resin constituting the body of the terminal bushing.

Further objects and advantages will readily become apparent upon reading the following specification, taken in conjunction with the drawing, in which:

The figure is a vertical sectional view taken through a cast resinous terminal bushing illustrating the disposition of the current transformers relative to the axially disposed conductor stud.

Referring to the drawing, the reference numeral 1 generally designates a cast terminal bushing formed of a suitable synthetic thermosetting resinous material 2. As shown, the surface corrugations, or "petticoats" 3 may be cast integrally with the terminal bushing 1. Any suitable synthetic resin may be employed in the practice of the invention. Preferably, the thermoset resin utilized for the body 4 of the terminal bushing 1 should be one that has good physical strength, has a relatively low shrinkage during curing, and has good adherence to metal. The resinous polymeric epoxides, such as a thermosetting resin comprising a glycidyl polyether of a polyhydric phenol having a 1,2-epoxy equivalence of between 1 and 2, have been found to meet the foregoing requirements, and have been successfully utilized in making bushings of the present type. Such epoxide resins are described in U.S. Patents 2,728,744 and 2,739,134. Polyester resin compositions, silicones, and any other thermosetting casting resins, which may include substantial amounts of fillers, commonly utilized for electrical insulation may be utilized in the present structure. Polyester or epoxy resin containing from 20% to 70% of hydrated alumina may be used.

The polyester resin comprises a material comprising the reaction product of a polyhydric saturated or unsaturated alcohol and a saturated or unsaturated poly-basic acid either with or without a modifying unsaturated monomer such as styrene, etc. Specific examples of the basic material are, for instance, diethylene glycol maleate, dipropylene glycol maleate, diethylene glycol fumerate, etc. Such materials are readily polymerized by peroxy catalysts such as benzoyl peroxide, tertiary butyl perbenzoate, etc.

As well known by those skilled in the art, casting resins are frequently utilized for electrical insulation in applications which require the resin to be poured into a shell, which serves as a mold during the curing process. The mold may be removed thereafter for reuse. It will, therefore, be apparent that the improved terminal bushing of the present invention may be fabricated by securing the central terminal stud 6 in a proper central position within the mold, and pouring the synthetic resinous material around the axially-disposed terminal stud 6 through suitable pouring apertures provided in the mold, not shown.

With reference to the figure, it will be observed that a plurality, in this particular instance two, current transformers 10 may be integrally molded within the terminal bushing 1 and by so doing may have a magnet structure 10a for the current transformer 10 of reduced dimensions. In other words, the diameter of the iron core 10a of the current transformer 10 may be selected in such case as a function of the dielectric strength of the insulating resinous material 2 used in the manufacture of the bushing 1, and the diameter of the flange collars of the bushing do not need to be taken into consideration. With the foregoing construction, it is apparent that the current tranfsormers are located within the insulating material 2 of the terminal bushing 1. This has the distinct advantage of permitting assemblies of current transformer and terminal bushings to be less bulky and more accurately located than designs heretofore known in the art. In addition, the current transformers 10 may be accurately centered with respect to the centrally-disposed terminal stud 6. Thus, the precision and the performance of the current transformer 10 is improved; and moreover the total volume of the assembly 1 is reduced in comparison with known arrangements.

The central terminal stud 6, which may be of a suitable conducting material, such as copper, constitutes the axial conductor for the terminal bushing, and passes through the wall 11 of the electrical apparatus in question, being enveloped by the insulating resinous material 2, poured and polymerized. As shown in the drawing, the insulating material also embeds the two current transformers 10, the terminals 12 of which may be located at the edge of the flange portion 13 of the bushing collar.

In order to improve the distribution of the electric field inside of the bushing 1 and at the surface 4a of it, an electrostatic shield 15, made of metallic mesh, may be placed within the resin 2 on the inside of the current transformers 10 as shown. The electrostatic screen 15 may be, as needed, kept at a fixed potential or at a floating potential.

According to the particular embodiment of the invention illustrated in the drawing, the electrostatic screen 15 is cylindrical, since it is evident that this form should be used for desirable best distribution of the electric field. It is of particular advantage to arrange for two current transformers 10 in a single bushing 1, since one of these current transformers 10 may be used for actual measurement, whereas the other current transformer 10 may be utilized for control of relays, or other elements of instrumentation.

From the foregoing description, it will be apparent that there is provided an improved resinous terminal bushing 1 comprising a thermosetting resin 2 which is molded according to accurate dimensions. The bushing 1 is of minimum size, and provides for a smaller diameter of the current transformers 10, which may be embedded therein. The device is rugged and is not susceptible to breakage as is the case with porcelain-clad terminal bushings. In addition, the dimensions of the magnetic circuit 10a for the current transformers 10 may be considerably reduced over prior-art arrangements.

Although there has been illustrated and described a specific structure, it is to be clearly understood that the same was merely for the purpose of illustration, and that changes and modifications may readily be made therein by those skilled in the art, without departing from the spirit and scope of the invention.

I claim as my invention:

A resinous-type terminal bushing adaptable for insertion through an opening in a housing for enclosing electrical apparatus, such as transformers, circuit interrupters and the like, including, in combination, an axially-extending terminal stud, a thermoset resinous material for the entire body portion of the terminal bushing in which said axially-extending terminal stud is completely embedded, said resinous body portion including a circumferentially-extending outwardly-protruding integral molded flange portion adaptable for overlying the opening of the apparatus housing and having an abutting contacting face, at least one current transformer embedded in the resinous material of said body portion and disposed on the external bushing side of the plane of said contacting face, mounting-bolt means extending through said integral molded flange portion, and the current transformer terminals being supported on said molded flange portion.

References Cited by the Examiner
UNITED STATES PATENTS

| | | | |
|---|---|---|---|
| 2,924,796 | 2/1960 | Stauber et al. | 336—96 |
| 2,925,570 | 2/1960 | Strock | 336—175 X |
| 2,945,912 | 7/1960 | Imhof | 174—143 X |

FOREIGN PATENTS

| | | |
|---|---|---|
| 569,263 | 1/1924 | France. |
| 1,144,430 | 4/1957 | France. |
| 118,662 | 3/1901 | Germany. |
| 166,838 | 4/1934 | Switzerland. |
| 262,655 | 10/1949 | Switzerland. |

JOHN F. BURNS, *Primary Examiner.*

JOHN P. WILDMAN, E. JAMES SAX, *Examiners.*